Patented Feb. 10, 1953

2,628,153

UNITED STATES PATENT OFFICE 2,628,153

FLUORIDE-CONTAINING IMPRESSION MATERIALS

Stanley E. Noyes and Edwin H. Lochridge, Glendale, Calif., assignors to Dental Perfection Company, Glendale, Calif., a corporation of California No Drawing. Application April 7, 1952,
Serial No. 281,025

12 Claims. (Cl. 18—47)

This invention has to do with improvements in dental impression materials of the general type comprising a mixture of a gel-forming agent, a metallic ion or compound which is reactive with such agent, and other possible components known as fillers and controllants or retarders, the material when mixed with water being capable of forming an elastic impression against which a plaster, e. g. plaster of Paris, may be poured to form the usual stone cast.

This type of impression material may employ any of various gel-forming agents among which are the sodium, potassium and ammonium alginates, the pectin or pectate-derived gellable substances including the alkali metal pectin compounds or pectates, also the gellable oxidized cellulose type of compounds, typically sodium, potassium or ammonium carboxy methyl cellulose. For purposes of the present invention the alginates may be regarded as preferred, but in its broad aspects the invention contemplates the use of any of these gelling agents, or mixtures thereof, which are combinable with a metal ion under controllable conditions to form an elastic gel capable of accurately reproducing the subjects to be cast.

Useable compounds of metallic ions reactive with the gelling agent are the calcium sulfates, i. e. the decahydrate, dihydrate and hemihydrate, lead compounds including lead oxide, lead monosilicate, lead disilicate, basic lead sulfate, basic lead carbonate and other lead salts, also salts of other metals including zinc, strontium, etc. Only in certain specific aspects is the invention concerned with the particular metal or combination of metals used, and in general it may be stated that in its broader objectives, the invention contemplates the use of any metallic compound or mixtures thereof, reactive with the gelling agent to produce a satisfactory elastic gel.

Commonly used retarders include the alkali metal carbonates, notably sodium carbonate, and the alkali metal phosphates and polyphosphates, e. g. trisodium phosphate and polyphosphate, sodium meta, ortho and pyrophosphates. Also useable as the retarder may be the metal salts of substituted acids of ethylene diamine dealt with in a copending application Serial No. 260,929 of Edwin H. Lochridge filed December 10, 1951. The invention contemplates that any of these retarders or mixtures thereof may be used in accordance with the requirements of any particular impression material.

The impression material may also include any appropriate filler such as powdered talc, clay, diatomaceous earth, calcium carbonate, silica and the like, all of which are relatively inert.

The invention is more particularly concerned with the incorporation in the impression material of a constituent that will assure desirably hard and smooth surface setting of the plaster casting material at the impression-cast interface. It may be mentioned in this connection that the general procedure followed in making the so-called stone cast, is to pour plastic plaster of Paris against the impression and to allow the cast to harden and set in contact therewith. Now it is found that many impression compositions so inhibit or interfere with proper setting of the plaster that the plaster surfaces in contact with the impression will not set with the necessary smoothness and hardness, and consequently the cast either will lack durability or accuracy because of the impositive set of those surfaces definitive of the impression. One practice used to obviate this condition has been to prepare a separate fixing solution into which the impression is dipped before application of the plaster, a sufficient amount of the fixing solution adhering to the interface impression surface to produce hardening of the plaster.

We have determined in accordance with the invention that the impression material itself may be rendered non-inhibiting in relation to the stone set by incorporating in the material a small amount, say from 1 to 2 grams, of an alkali metal fluoride. Although all the reasons for the effectiveness of the fluoride are not fully understood, tests have demonstrated its performance in impression materials having various compositions with relation to the specific gel-forming agent and metallic component used.

A further feature and advantage pertaining to the use of the alkali metal fluoride in certain compositions is its function as an effective promoter for reaction between the gel-forming agent and the hemi-hydrate calcium sulphate, where a phosphate or polyphosphate is used as the retarder. To illustrate, it is found that in an impression material composition containing a gel-forming agent, typically an alkali metal alginate, and calcium sulphate hemi-hydrate with or without the presence of a lead compound such as lead monosilicate, the reaction between the alginate and metallic ion or ions will progress satisfactorily and at a rate properly controllable by an alkali metal phosphate or alkali metal polyphosphate, in the presence of a fluoride such as sodium fluoride or potassium fluoride. And as previously indicated, the presence of the latter also assures hard and smooth surface setting of the plaster cast at the interface. Where the essentially or predominately effective metallic component in the mixture is calcium sulphate hemi-hydrate, other metallic compounds such as lead oxide, lead silicate, basic lead carbonate, basic lead sulphate, barium sulphate, zinc silicate and zirconium silicate may be used primarily as weighting and body building additives.

The following are given as typical impression material compositions embodying the invention:

*Example 1*

25.0 grams diatomaceous earth
7.0 grams potassium alginate (low viscosity)
12.0 grams lead monosilicate
3.5 grams Hydrocal
1.5 grams potassium fluoride
.2 gram tetrasodium pyrophosphate

*Example 2*

25.0 grams diatomaceous earth
7.0 grams potassium alginate (low viscosity)
12.0 grams lead silicate
10.5 grams calcium sulphate hemihydrate
1.0 gram tetrasodium pyrophosphate
1.5 grams sodium fluoride

We claim:

1. A dental impression composition comprising a gel-forming component of the group consisting of a water-soluble alginate, a gellable pectin material and carboxy methyl cellulose, a metallic salt component reactive with said gel-forming component in solution to form an elastic gel impression against which a plaster casting material may be poured, and an alkali metal fluoride uniformly distributed within the composition and operable therewith to cause formation of a hard and smooth plaster surface at the impression-cast interface.

2. A composition as defined in claim 1, in which the fluoride is sodium fluoride.

3. A composition as defined in claim 1, in which the fluoride is potassium fluoride.

4. A composition as defined in claim 1, in which the gel-forming component is an alkali metal alginate.

5. A composition as defined in claim 1, in which the gel-forming component is a gellable pectin material.

6. A composition as defined in claim 1, in which the gel-forming component is a carboxy methyl cellulose.

7. A composition as defined in claim 1, in which the metallic salt component contains lead ions reactive with the gel-forming agent.

8. A composition as defined in claim 1, in which the metallic salt component comprises calcium sulphate.

9. A dental impression composition comprising a gel-forming component of the group consisting of a water-soluble alginate, a gellable pectin material and carboxy methyl cellulose, a metallic salt component including calcium sulphate hemi-hydrate reactive with said gel-forming component in solution to form an elastic gel impression against which a plaster casting material may be poured, a phosphate retarder, and an alkali metal fluoride uniformly distributed within the composition and operable therewith to cause formation of a hard and smooth plaster surface at the impression-cast interface.

10. A composition as defined in claim 9, in which the phosphate is an alkali metal polyphosphate.

11. A composition as defined in claim 9, in which the metallic salt component comprises a lead compound reactive with the gel-forming component.

12. A composition as defined in claim 9, in which the metallic salt component comprises a lead silicate reactive with the gel-forming component and in which the phosphate is an alkali metal polyphosphate.

STANLEY E. NOYES.
EDWIN H. LOCHRIDGE.

REFERENCES CITED

The following references are of record in the file of this patent:

UNITED STATES PATENTS

| Number | Name | Date |
|---|---|---|
| 2,422,497 | Noyes | June 17, 1947 |
| 2,568,752 | Lochridge | Sept. 25, 1951 |